Jan. 4, 1949.                R. B. GRAY                 2,458,260
                      WINDSHIELD WIPER MECHANISM
Filed Oct. 4, 1943                                 2 Sheets-Sheet 1
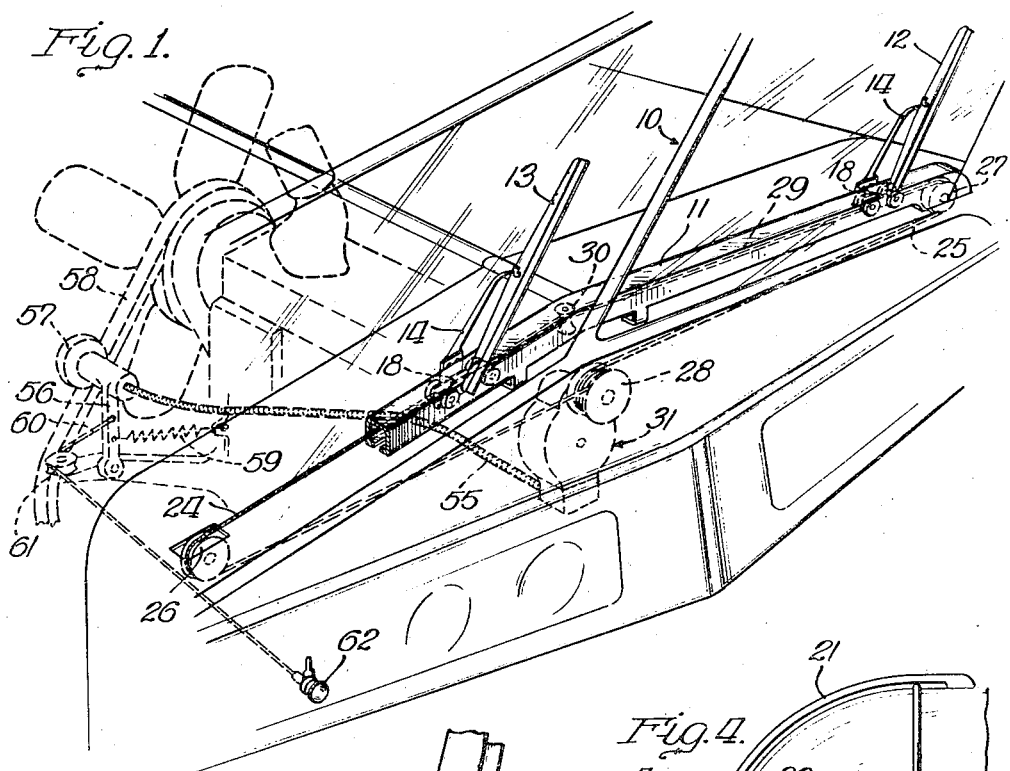
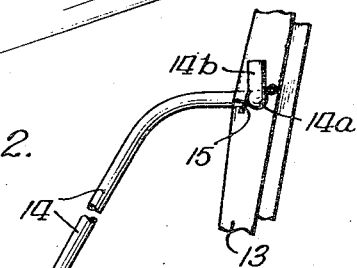
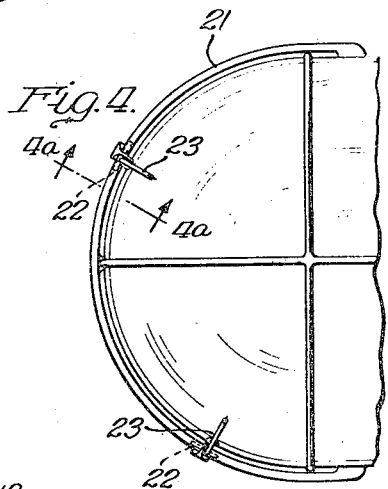
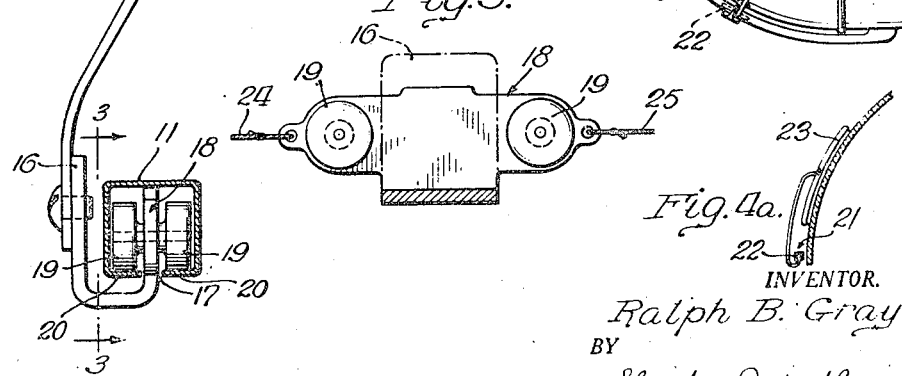
INVENTOR.
Ralph B. Gray
BY
Sheridan, Davis and Cargill
Attys.

Jan. 4, 1949.  R. B. GRAY  2,458,260
WINDSHIELD WIPER MECHANISM
Filed Oct. 4, 1943  2 Sheets-Sheet 2
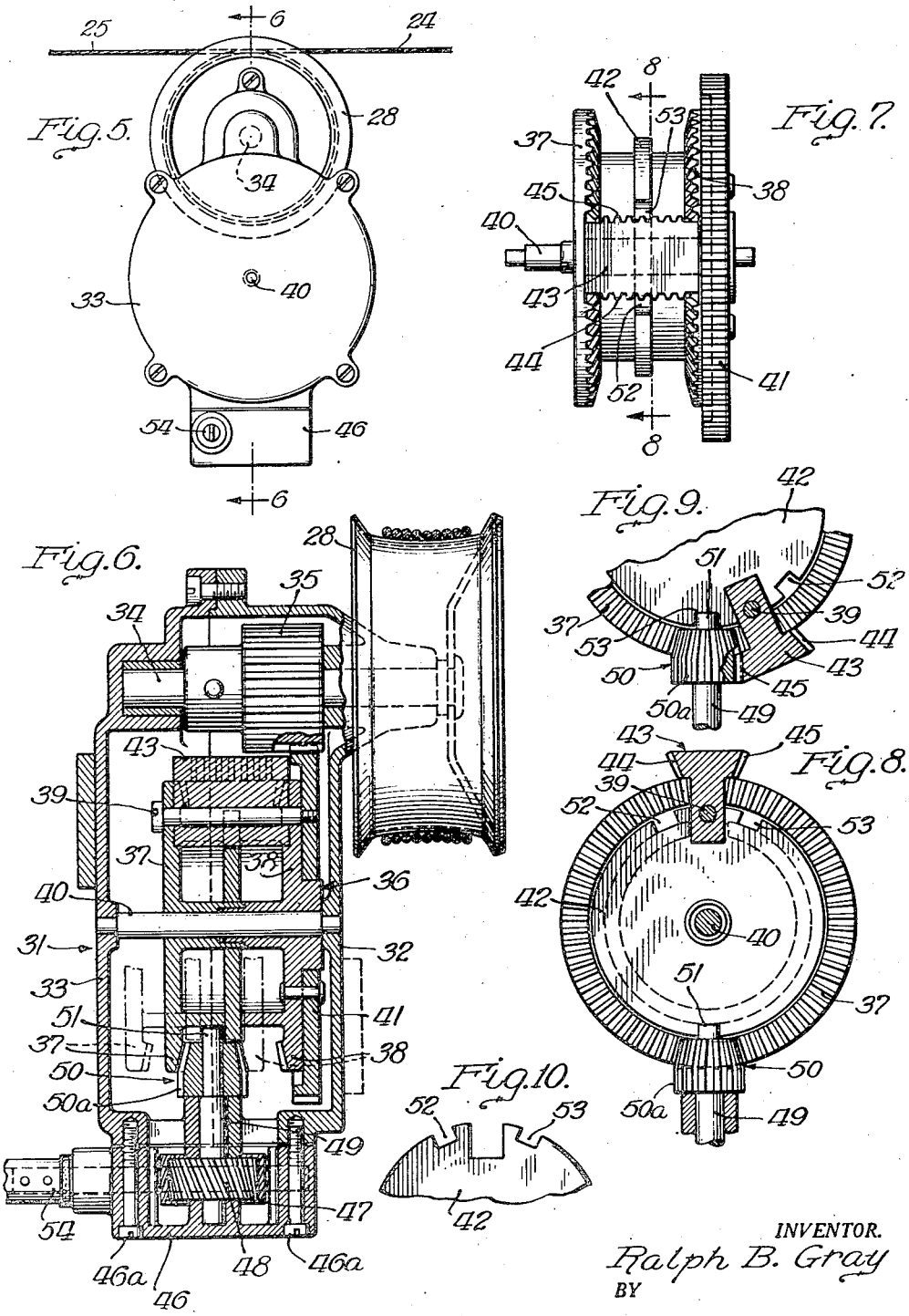
INVENTOR.
Ralph B. Gray
BY
Sheridan, Davis and Cargill
Attys.

Patented Jan. 4, 1949

2,458,260

UNITED STATES PATENT OFFICE 2,458,260

WINDSHIELD WIPER MECHANISM

Ralph B. Gray, Chicago, Ill.

Application October 4, 1943, Serial No. 504,865

3 Claims. (Cl. 74—321)

This invention relates to improvements in windshield wiper mechanism.

One object of the invention is to provide means for operating one or more windshield wiper blades in horizontal paths, preferably lengthwise of the windshield over the entire windshield or a substantial portion thereof for affording clear vision through the whole or substantially the entire length of the windshield.

Another object of the invention is to provide improved operating means for reciprocating windshield wiper elements or blades over plain or curved windshields.

An additional object of the invention is to provide an improved motion translating mechanism for converting uni-directional rotary movement of a driving member into periodical reversing rotary movement in a driven member.

Other objects of the invention relate to various features of construction and arrangement of parts which will be apparent from a consideration of the following specification and accompanying drawings wherein Figure 1 is a phantom view of portions of a motor vehicle adjacent the windshield;

Figure 2 is an enlarged vertical sectional view illustrating a windshield wiper element and associated carrier and guiding track therefor;

Figure 3 is a view taken on line 3—3 of Fig. 2;

Figure 4 is a top plan view of a curved windshield illustrating the adaptation thereto of the improved wiper mechanism;

Figure 4a is a vertical sectional view taken on line 4a—4a of Figure 4.

Figure 5 is an elevational view of a winding drum for effecting reciprocating movements of one or more wiper elements and reversing means for operating the drum;

Figure 6 is an enlarged sectional view taken on line 6—6 of Fig. 5;

Figure 7 is a top plan view of a detached portion of the reversing mechanism;

Figure 8 is a broken sectional view taken on line 8—8 of Figure 7;

Figure 9 is a view similar to Figure 8 but showing the parts in different relative positions; and Figure 10 is a broken elevation of a part of the reversing mechanism shown in detached relation.

In Figure 1 of the drawing wherein an illustrative embodiment of the invention is disclosed, 11 indicates a track member which, as shown, is located above a cowl of a motor vehicle forwardly of the windshield 10. The track member 11 is shown as being formed of sheet metal and is adapted to lie parallel with the windshield.

In the embodiment illustrated the track is somewhat V-shaped in plan view to correspond to the shape of windshields (shown in Figure 1) of latest model motor vehicles. One or more wiper elements may be operated by the improved mechanism, and since a V-shaped windshield is shown, two wiper elements 12 and 13 are illustrated in Fig. 1, each arranged for operation in a horizontal path across the respective portions of the windshield. The wiper elements 12 and 13 are provided with transverse openings for detachably mounting the elements on the arms 14 which are sufficiently flexible to insure proper functioning of the wiper elements. The arms are provided with transversely extended portions 14a on which the wiper elements are mounted and are freely pivoted for maintaining uniform contact throughout the length thereof with the glass. The ends of the arms terminate in upwardly extended portions 14b which, while they permit ready replacement of the elements, retain the same against dislodgement in use. Cotter pins 15 may be employed as additional safeguards against displacement of the elements if desired. This arrangement off-sets the vertical plane of the elements from the respective arms 14 and insures that the elements can follow the plane of the glass without interference by the arms. The arms 14 as shown, extend beneath the forward lower edge of the track member 11 and into engagement with brackets 16 (see Fig. 2) which project through the slot 17 provided in the lower portion of the track 11.

The inner portion of the brackets 16 constitute carrier 18 which are provided with rollers 19 which travel on the inwardly directed flanges 20 of the track member 11. Reciprocation of the carriers 18 causes reciprocation of the wiper elements 13 in wiping contact with the forward face of the windshield.

Where the improved wiper mechanism is to be used in conjunction with a windshield which is of curved configuration as shown in Figs. 4, and 4a, a similarly shaped track member 21 may be provided adjacent the lower edge of the windshield which is provided with one or more carriers 22 as may be required for operating wiper elements 23 along the surface of the windshield. The wiper elements are properly shaped to make proper contact with the surface of such curved windshields and, since they are held vertical during their reciprocating movements, maintain proper wiping action with the glass.

For effecting reciprocation of the carriers 18 shown in Fig. 1, carriers 23 shown in Figs. 4 and 4a, flexible members or cables 24 and 25, sections shown in Fig. 1 are provided which are attached to the carriers and are trained therefrom over pulleys 26 and 27 respectively and are extended into engagement with a winding drum 28, which is positioned beneath the track 11 in the embodiment illustrated in Fig. 1. Where two carriers are provided as shown in Fig. 1, they are connected by an intermediate flexible member 29. In line with the apex of the V-shaped windshield, a guiding pulley or spool 30 is shown in Fig. 1, over which the cable section 29 passes for maintaining the right and left hand portions of the cable 29 in alignment with the corresponding portions of the track member 11.

The cable sections 24 and 25 are attached to the winding drum 28 in such manner that rotation of the drum in one direction pays out one of the cable sections while it takes in the other cable section and reverse operation of the spool effects the reverse actuation of the cable sections. The carriers 18 thus can be reciprocated within the track for effecting reciprocation of the windshield wiper elements along the windshield. The length of the strokes of the wiper is controlled by the amount of cable wound up and paid out by the drum, but where the mechanism is employed for operating windshield wipers, the wiper elements are preferably caused to move substantially the entire length of the sections of the windshield against which they operate for affording maximum visibility.

Associated with the winding drum 28 is a drum operating mechanism indicated generally by the numeral 31 which is shown in detail in Figs. 5 to 10, inclusive. The mechanism 31 comprises, in the embodiment illustrated, two cooperating casing sections 32 and 33, in the upper portion of which is journalled a shaft 34 provided with a gear 35 fixed thereto.

The drum 28 is secured to the shaft 34 for operation thereby in one direction or the other depending on the direction of operation of the gear 35. Within the casing formed by the sections 32 and 33 is a member indicated generally by the numeral 36 and comprising two ring gears 37 and 38 secured with their respective beveled teeth facing inwardly. The gears 37 and 38 are spaced apart as illustrated and may be secured together by any suitable fastening means such as one or more screws such as indicated at 39, one only being shown. The gear member 36 is rotatably and laterally shiftably mounted on a shaft 40 supported by the casing sections 32 and 33. Also secured to the member 36 is a gear 41 which remains constantly in mesh with the gear 35, the teeth of the latter being substantially longer than the teeth of gear 41 whereby the latter remains in mesh with the gear 35 during the lateral shifting movements of the member 36. Disposed between the gears 37 and 38 is a disc 42, the outer periphery of which constitutes a guiding rib, the function of which will be hereinafter explained. Extending transversely of the gears 37 and 38 is a shifting member 43 having racks 44 and 45 on opposite edges as shown in Fig. 7. The rack member 43 may be secured to the gears by the screw 39 shown in Fig. 6.

A casing section 46 is shown attached to the lower portion of the casing 31 by means of screws 46a or the like. In the casing section 46 is journalled a worm 47 which meshes with a worm wheel 48 mounted on a shaft 49 which carries a driving pinion 50. The upper end 51 of the shaft 49 extends coaxially in the form of a stud beyond the forward end of the pinion 50 as shown in Fig. 6. Referring to the latter figure it will be seen that the pinion 50 is in mesh with the teeth of the gear 37 and that the guiding rib 42 constitutes a guard which in cooperation with the stud 51 retains the pinion 50 and gear 37 in cooperative relationship. Hence, when the pinion 50 is rotated by means of the worm 47 and worm gear 48, the member 36 and the attached gear 41 will likewise be rotated for effecting rotation of the gear 35 which in turn produces rotary movement of the winding drum 28. It will be seen by reference to Figs. 7, 8 and 9 that the rotation of the pinion 50 while in mesh with the gear 37 can effect rotation of the dual gear member 36 in one direction until the rack bar 36 has been moved into contact with the teeth of the pinion 50, whereupon movement of the member 36 in that direction will be arrested. When one set of teeth 44 or 45 of the rack bar has been brought into contact with the teeth of the pinion 50 as mentioned, continued operation of the pinion 50 will, by reason of the meshing of the teeth thereof with the respective rack bar, shift the member 36 along the shaft 40 until the pinion is in meshing engagement with the teeth of the rack 38, whereupon the member 36 will be operated in the opposite direction. If it be assumed that the gear 50 operates in a clockwise direction as viewed from the bottom of Fig. 6, the member 36 will be operated in a clockwise direction as viewed from the right-hand side of said figure, and hence the rack bar 45 will be brought into engagement with the teeth of the cylindrical portion 50a of the pinion 50 which will shift the member 36 to the left as viewed in Fig. 6 or from the full line to the dotted line position, whereupon the teeth of gear 38 will be brought into driving engagement with the beveled teeth of the pinion 50 to produce rotation of the member 36 in the counter-clockwise direction. Rotation in the last-mentioned direction of the member 36 through an arc of slightly less than 360° will move the rack bar 44 into engagement with the portion 50a of the pinion 50, whereupon the member 36 will be shifted from the dotted line position to the right to the full line position shown in Fig. 6, whereupon the member 36 will again be rotated in the clockwise direction. To permit such shifting movement of the member 36, at the end of each cycle of rotation thereof, the rib 42 is provided with two notches 52 and 53 adjacent each of the rack bars 44 and 45, respectively, and which are brought alternately into lateral registrations with the stud-like end 51 of the shaft 49 to permit the rib 42 to shift from one side to the other of the stud 51, as from the full line position of the rib shown in Fig. 6 to the dotted line position thereof and vice versa.

The cooperation of the rib 42 and the stud 51 thus retains the pinion 50 in driving relation with the gears 37 or 38 alternately during the rotative cycles of member 36 and in the two positions of the member 36 wherein the rack bars 44 and 45 are in engagement with the teeth of the pinion, the member 36 is shifted laterally in one direction or the other for producing reversal in the direction of rotation of the member 36 during the succeeding cycle. It will thus be seen that while the pinion 50 operates in one direction, the member 36 is driven thereby first in one direction through nearly 360° of rotation and is then shifted laterally and rotated in the opposite direction through a similar arc. During such rotations and shifting movements of the member 36, the gear 41 which may be considered a part of the member 36 is rotated and shifted in like directions, but remains constantly in mesh with the driven gear 35 due to the length of the latter and hence the drum 28 is rotated first in one direction and then in the other, and hence takes in one of the flexible members 24 or 25 while it concurrently passes out the other member and thereby effects reciprocation of the elements 12 and 13.

The worm 47 may be operated from any suitable source of power, but in the drawings it is shown coupled at 54 with a flexible shaft 55 (see Fig. 1) which is journalled at its forward end in a pivotally mounted arm 56 and carries a friction driving member or pulley 57 which is adapted to be moved into and out of contact with the fan belt 58 of the vehicle. The arm 56 is shown attached to a spring 59 which tends to hold the arm in position for effecting driving relation between the pulley 57 and belt 58. For the purpose of interrupting the driving relation between the pulley 57 and belt 58, any suitable means may be provided for swinging the bracket in a direction against the action of the spring 59. For such purpose there is shown in Fig. 1 a cable 60 trained around a pulley 61 and extending into the interior of the vehicle. The cable 60 is shown attached to a knob 62 which may be pulled outwardly and releasably latched in the outer position for interrupting the driving of the pulley 57 by the fan belt for interrupting the operation of the wipers.

The present improvements shown in Figs. 5 to 10, inclusive, may be employed for effecting reciprocation of one or more windshield wipers such as shown in Figs. 1 to 4a or for effecting reciprocation of one or more other devices as may be seen. The wipers shown are reciprocated over the sections or the portions of a windshield which are disposed in different planes as shown in Figs. 1 and 4, but the lack of parallelism of the paths of the wipers present no obstacles to the smooth, efficient operation of the wiper blades due to the fact that the wiper arm carriers are guided by track sections disposed or shaped to correspond with the plane or shape of the respective windshield section and are operated in synchronism by flexible cable sections preferably from the single power mechanism shown in Figs. 5 to 10. The cross-sectional shape of the windshield, whether plane but with the sections in different planes as shown in Fig. 1, or curved even in both horizontal and vertical sections as shown in Figs. 4 and 4a can be wiped cleanly by the improved wipers and thereby provides a versatile wiper mechanism that can be adapted for use on windshields that cannot be wiped substantially throughout the length of the non-coplanar sections by conventional wipers that oscillate about a fixed axis. While a specific structure illustrative of the present improvements has been disclosed, it will be apparent that various changes in the detail thereof may be resorted to without departing from the spirit of the invention defined by the accompanying claims.

I claim:
1. A reversible winding means for a flexible member comprising a rotatable winding drum for said flexible member, a rotatable shaft on which said drum is fixed for rotation therewith, a driven gear on said shaft, a laterally shiftable driving gear meshing with said driven gear for operating the latter, and means for operating said driving gear alternately in opposite directions for effecting reversal of the direction of rotary movement of said drum comprising a uni-directionally operated pinion, a pair of connected laterally shiftable ring gears disposed on opposite sides of said pinion and secured to said driving gear, and means for effecting the lateral shifting of said ring gears for moving the same alternately into driven engagement with said pinion.

2. Means for operating a rotary shaft alternately in opposite directions comprising a gear fixed on said shaft, a second gear meshing constantly with said first gear for driving the same and slidable laterally relatively thereto, a uni-directionally operated pinion, means for operating said pinion, a laterally shiftable member comprising a pair of spaced ring gears secured to said second gear for operating the latter and arranged on oppostite sides of said pinion, and means cooperating with said pinion for effecting cyclic shifting of said member for causing alternate driven engagement of said ring gears with said pinion for effecting rotation of said member cyclically in opposite directions for similarly driving said shaft through said first and second gears.

3. Means for rotating a shaft in opposite directions alternately comprising a gear on the shaft, a laterally shiftable second gear meshing constantly with said first gear for driving the same, a uni-directionally operated driving pinion, and cyclical reversing transmission means operable by said pinion for driving said second gear first in one direction and then in the other comprising a laterally shiftable rotary member secured to said second gear for driving the same and comprising a pair of ring gears disposed on opposite sides of said pinion and provided with means cooperating with said pinion for shifting said member laterally in opposite directions for effecting alternate driven engagement of said ring gears with said pinion.

RALPH B. GRAY.

REFERENCES CITED

The following references are of record in the file of this patent:

UNITED STATES PATENTS

| Number | Name | Date |
|---|---|---|
| 1,511,309 | Vernet | Oct. 14, 1924 |
| 1,625,512 | Vernet | Apr. 19, 1927 |
| 1,780,578 | Christy | Nov. 4, 1930 |
| 2,063,055 | Shaw | Dec. 8, 1936 |
| 2,112,197 | Horton | Mar. 22, 1938 |

FOREIGN PATENTS

| Number | Country | Date |
|---|---|---|
| 370,394 | France | Feb. 5, 1907 |